(12) United States Patent
Lange et al.

(10) Patent No.: US 9,046,170 B2
(45) Date of Patent: Jun. 2, 2015

(54) DEVICE FOR THE PULSED RELEASE OF AN AMOUNT OF FLUID WHICH CAN BE STORED IN AN ACCUMULATOR HOUSING

(75) Inventors: Norbert Lange, Saarbrücken (DE); Norbert Weber, Sulzbach/Saar (DE)

(73) Assignee: Hydac Technology GmbH, Sulzbach/Saar (DE)

( * ) Notice: Subject to any disclaimer, the term of this patent is extended or adjusted under 35 U.S.C. 154(b) by 644 days.

(21) Appl. No.: 13/261,219

(22) PCT Filed: Sep. 29, 2010

(86) PCT No.: PCT/EP2010/005923
§ 371 (c)(1),
(2), (4) Date: Mar. 15, 2012

(87) PCT Pub. No.: WO2011/047774
PCT Pub. Date: Apr. 28, 2011

(65) Prior Publication Data
US 2012/0167704 A1    Jul. 5, 2012

(30) Foreign Application Priority Data

Oct. 19, 2009 (DE) .......... 10 2009 050 833
Oct. 19, 2009 (DE) .......... 10 2009 050 847
Oct. 19, 2009 (DE) .......... 10 2009 050 848

(51) Int. Cl.
*F15B 1/24* (2006.01)
*F16H 61/00* (2006.01)
*F15B 21/06* (2006.01)

(52) U.S. Cl.
CPC ....... *F16H 61/0021* (2013.01); *Y10T 74/20024* (2015.01); *F15B 1/24* (2013.01); *F15B 21/065* (2013.01); *F15B 2201/21* (2013.01); *F15B 2201/31* (2013.01); *F15B 2201/40* (2013.01); *F16H 2061/0034* (2013.01); *Y02E 60/15* (2013.01); *F16H 2312/14* (2013.01)

(58) Field of Classification Search
USPC ............ 91/41, 42, 44; 60/326; 92/23; 138/31
See application file for complete search history.

(56) References Cited

U.S. PATENT DOCUMENTS

| | | | | |
|---|---|---|---|---|
| 4,377,374 | A | * | 3/1983 | Taylor ........................... 417/228 |
| 5,474,042 | A | * | 12/1995 | Kaneda ..................... 123/196 S |
| 7,428,922 | B2 | * | 9/2008 | Fripp et al. .................. 166/66.5 |
| 7,975,725 | B2 | * | 7/2011 | Lauterbach ..................... 138/31 |

FOREIGN PATENT DOCUMENTS

| | | |
|---|---|---|
| DE | 10 2005 049177 | 4/2007 |
| DE | 10 2006 014756 | 10/2007 |
| DE | 10 2007 000 637 | 5/2008 |
| EP | 0 058 268 | 8/1982 |

* cited by examiner

*Primary Examiner* — Thomas E Lazo
(74) *Attorney, Agent, or Firm* — Roylance, Abrams, Berdo & Goodman LLP

(57) ABSTRACT

A device for the pulsed release of an amount of fluid stored in a storage housing (2) has a locking device (7) formed by a piston-cylinder arrangement (8). The arrangement has a cylinder housing (9) subdivided into a first working chamber (11) and a second working chamber (12) by a working piston (10). An electrorheological or magnetorheological valve (14) in the form of a gap (15) or an opening is arranged between the working chambers (11, 12) in the circumference (13) of the working piston (10) or in the working piston (10).

14 Claims, 8 Drawing Sheets

DEVICE FOR THE PULSED RELEASE OF AN AMOUNT OF FLUID WHICH CAN BE STORED IN AN ACCUMULATOR HOUSING

FIELD OF THE INVENTION

The invention relates to a device for the pulsed release of an amount of fluid stored in an accumulator housing, in particular for implementing a start-stop function in automatic transmissions. The device comprises a piston, supported on a first energy accumulator and displaceable inside the accumulator housing, limits together with the accumulator housing the amount of fluid that can be accommodated. When actuated by an actuating device and released by a locking device, the piston pushes the amount of fluid out of the accumulator housing in a pulsed manner. The locking device holds the piston in its prestressed position, and, when actuated by the actuating device, releases the piston for movement to a release position.

BACKGROUND OF THE INVENTION

For reasons relating to saving fuel and minimizing the emission of pollutants, the current trend in modern vehicles is to shut down the internal combustion engine in suitable operating states. To facilitate driving despite such engine start-stop function, a short starting process of the internal combustion engine and an immediate force flow connection in the transmission of the vehicle is necessary.

In prior art automatic transmissions of motor vehicles or, for example, in automatic gearboxes, which are configured with wet-running multi-plate clutches, the clutches are adequately supplied with hydraulic fluid by a fluid supply device only when the internal combustion engine is running. When the intent is to allow the power to flow in such a transmission, the first step is to overcome the clutch play and to completely close the clutch or clutches by raising the fluid pressure. The play compensation of a clutch and its force flow connections are achieved by conducting an amount of fluid into a piston space of the hydraulically adjustable clutches that are to be connected, with the amount of fluid being made available by the fluid supply device. On start-up of the motor vehicle after having shut down the internal combustion engine, the situation may arise that a plurality of switching elements must be opened and closed in the transmission. As a result of the opening and closing, an unacceptably long period of time is required to produce a complete force flow connection in the transmission.

This drawback associated with the prior art transmissions with a hydraulic pump, which pump is driven by an electric motor and has a delivery rate that is independent of the speed of the internal combustion engine and which, in the absence of a pressure supply by the main pump of the transmission in the hydraulic system, generates at least a pressure. By that pump pressure, the clutch play can be compensated. However, the hydraulic pump, which can be driven by an electric motor, results in a degradation of the transmission efficiency and a higher cost of the transmission. Moreover, a significant amount of additional installation space is required in motor vehicles and has a complex design to connect to the hydraulic system of the transmission and to an electrical control and regulating system.

DE 10 2006 014 756 A1 shows and describes a device that is provided for the storage and pulsed release of an amount of hydraulic fluid for a transmission unit of a vehicle and that comprises an accumulator space. The accumulator space is defined by an accumulator housing and by a moveable limiting device designed as a piston and can be operatively connected to the transmission unit to exchange the amount of fluid. The piston is arranged in a moveable manner inside the accumulator space and is actuated by an actuating device. Furthermore, the piston is held in its prestressed position by a locking device. For this purpose, the locking device has a catch that keeps the piston in a prestressed position in its first energy accumulator that is designed as a compression spring. The locking device can be moved by the actuating device into a release position for the piston. As a result of the release, the amount of fluid is introduced in a pulsed manner into the transmission unit designed, in particular, as an automatic transmission.

In principle, such devices offer the option of providing fluid amounts adapted in a defined way to the demand of a specific consumer to implement a practical engine start-stop function for automatic transmissions. The prior art devices have at a minimum a complex structure or require a significant amount of installation space.

In addition, the locking devices and the actuating devices of such devices are often unnecessarily complex since their number of parts is not minimized with respect to implementing the necessary functions.

SUMMARY OF THE INVENTION

An object of the present invention is to provide an improved device for the pulsed release of an amount of fluid stored in an accumulator housing, in particular for implementing a start-stop function in automatic transmissions. That device is not only operationally fail-safe and requires little installation space, but is also easy to manufacture and is especially durable and wear-resistant.

This object is basically achieved with a device having, in particular, a locking device and an actuating device that do not need any mechanical parts that have to engage in the sense of locking or unlocking, because the locking device for the piston is formed by a piston and cylinder arrangement. A cylinder housing is subdivided into a first working chamber and a second working chamber by a working piston. The circumference of the working piston or the interior of the working piston itself has an electrorheological or magnetorheological valve in the form of a passage gap or an opening between the working chambers. An actuating device is configured such that the gap or the opening between the working chambers is charged with an electric or magnetic field of variable field strength. As a result of that field, the flow resistance of the electrorheological or magnetorheological fluid located in the working chambers is variable up to a blockade of the gap or the opening.

Consequently, the fluid flow is routed to the working piston by the magnetic field in the gap or in the opening. The result is a device that is controlled solely by a change in the magnetic field and has in total a small number of parts.

The device then has a simple configuration, requires no maintenance, and is rugged in use. Furthermore, the device according to the invention permits feeding, within the framework of the total storable amount of fluid, continuously selectable volumes of hydraulic fluid into the hydraulic system by changing interactively the flow resistance in the gap or the opening.

In an especially preferred exemplary embodiment of the device, the working piston of the locking device is firmly connected to the accumulator housing, with the cylinder housing for the working piston being formed by a rearward shaft that extends downward from the piston head. The shaft projects downward axially from the middle of the piston. In an exemplary embodiment according to the invention, the two working chambers are arranged radially between the shaft of the piston and the accumulator housing.

In an additional exemplary embodiment, the first and the second working chambers can also be arranged radially between the shaft and the working piston, with the working piston being designed as a cylinder with a bead or ring arranged radially on the circumference.

An electromagnetic coil for generating an electromagnetic field can be disposed in the working pistons or can be secured on a carrier that is rigidly mounted in the housing and that projects into the shaft of the piston. This feature minimizes the installation requirements of the device in an advantageous way. If, however, the installation requirement of the device is not a significant controlling factor, the coil can be expediently arranged on the exterior of the accumulator housing or with radial spacing on the exterior of the shaft of the piston.

In an easy to manufacture variant of the device, the shaft of the piston is designed as a hollow cylinder, and the accumulator housing is designed as a cylinder at least in the traversing range of the piston, by the piston being arranged together with the shaft in a longitudinally displaceable manner between a first end position and a second end position. The shaft is made preferably in one piece with the piston. The position of the shaft is chosen such that, in a position defining a maximum of the volume of the amount of fluid that can be accommodated, the shaft is in axial abutment with an end sided cover of the accumulator housing. It is expedient for a spring device to push out the fluid amount stored in the accumulator housing. In principle, the spring device can be a tension or compression spring or a working gas in an accumulator space. Other designs of spring devices as energy accumulators, like cup springs or the like, can also be used.

The amount of fluid that can be accommodated in the accumulator housing is equivalent to at least a fill volume of a hydraulic consumer, such as a shifting cylinder in an automatic transmission of a passenger vehicle. The device can be designed as an autonomous component in a gearbox or in a hydraulic control unit of the gearbox. The actuating device with the electrorheological or magnetorheological valve is deactivated, for example, after an engine stop in the event of a request to start the internal combustion engine of the motor vehicle. That is, the electrorheological fluid or the magnetorheological fluid in the two working chambers is not exposed to a magnetic field, so that when, for example, the compressive force of the first energy accumulator acts on the piston, the fluid of the working piston can quickly overcome the gap or the opening between the working chambers and the cylinder. The pulsed release of the amount of fluid from the accumulator space of the accumulator housing can also be performed, instead of at a request to start the internal combustion engine, by releasing the service brake of the motor vehicle.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings that form a part of this disclosure.

DETAILED DESCRIPTION OF THE INVENTION

Figure 1:
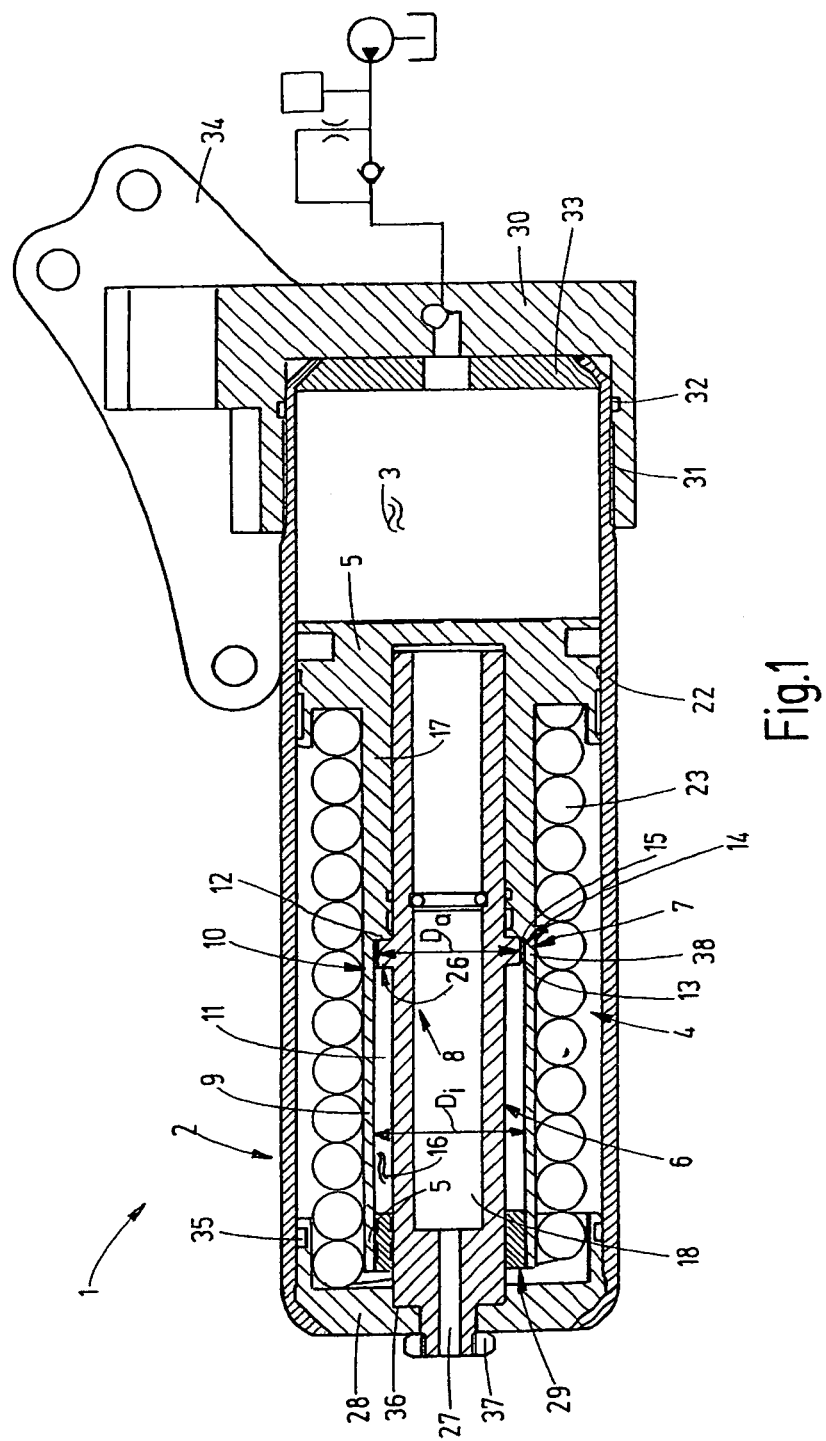
FIG. 1 is a side elevational view in section of a device according to a first exemplary embodiment in the fluid filled state.

FIG. 1 is a longitudinal sectional view of a device 1 for the pulsed release of an amount of fluid 3 that can be stored in an accumulator housing 2. The device 1 is used to store a working fluid for a consumer of a hydraulic system (not shown) used, for example, for the storage and pulsed release of hydraulic oil for a shifting cylinder of an automatic transmission of a passenger vehicle. The cylindrical accumulator housing 2 has a first energy accumulator 4 designed as a cylindrical compression spring. The energy accumulator 4 is used to apply a compressive force to a piston 5. This force is sufficient to move the piston 5 out of its prestressed position, shown in FIG. 1, into a position in which the amount of fluid 3 is pushed out of the accumulator housing 2 (cf. FIG. 2). In the position of the piston 5 shown in FIG. 1, the amount of fluid 3 is introduced in a pressurized state into the accumulator housing 2 by a known fluid conveying device, such as, for example, a rotary pump. After the filling process, the piston 5 is held in the illustrated prestressed position by a locking device 7.

The locking device 7 comprises a piston and cylinder arrangement 8. In the exemplary embodiment depicted in FIG. 1, the piston and cylinder arrangement 8 includes a working piston 10 firmly connected to the accumulator housing 2. The working piston 10 is designed as a more or less cylindrical sleeve with an elevation 26 that forms a ring on the circumference 13 and is disposed at roughly half the axial length. Above the working piston 10, a cylinder housing 9 is formed by a shaft 17 at the piston 5. The working piston 10 has an outside diameter $D_a$ that corresponds to that of the inside diameter $D_i$ of the shaft 17 in a packing box area S, plus a dimensional tolerance. The annular expansion 26 is spaced apart from the cylinder housing 9, thus forming a gap 15, and forms a kind of separation between a first working chamber 11 and a type of second working chamber 12 between the working piston 10 and the cylinder housing 9. The gap 15 is designed as an annular gap. The expansions 26 forms together with the gap 15 a valve 14 for an electrorheological fluid 16, which fluid is filled into the two working chambers 11, 12. The interior of the working piston 10 has an electromagnetic coil 18, which coil projects beyond the expansion 26, on an end facing away from the piston 5. The coil is energized by an axial opening 27 in a cover 28, which cover closes the accumulator housing 2 at the face side.

The viscosity of the electrorheological fluid changes as a function of the energizing of the coil 18 and the electromagnetic field. As shown in FIG. 1, fluid cannot flow from the first working chamber 11 filled with fluid 16, over the gap 15 in the direction of the second working chamber 12. The first working chamber 11, which extends axially from a sealing device 29, forming the stuffing box area S, as far as up to the expansion 26 at the working piston 10, remains totally filled with the electrorheological fluid 16. The tensile forces are transmitted from the sealing device 29 over the shaft 17 to the piston 5, which forces hold the piston 5 in its position.

The locking device is formed in this way by the piston and cylinder arrangement and the electrorheological fluid. The coil 18 forms together with a control unit, actuating the coil and providing the electric voltage, the actuating device 6.

Figure 2:
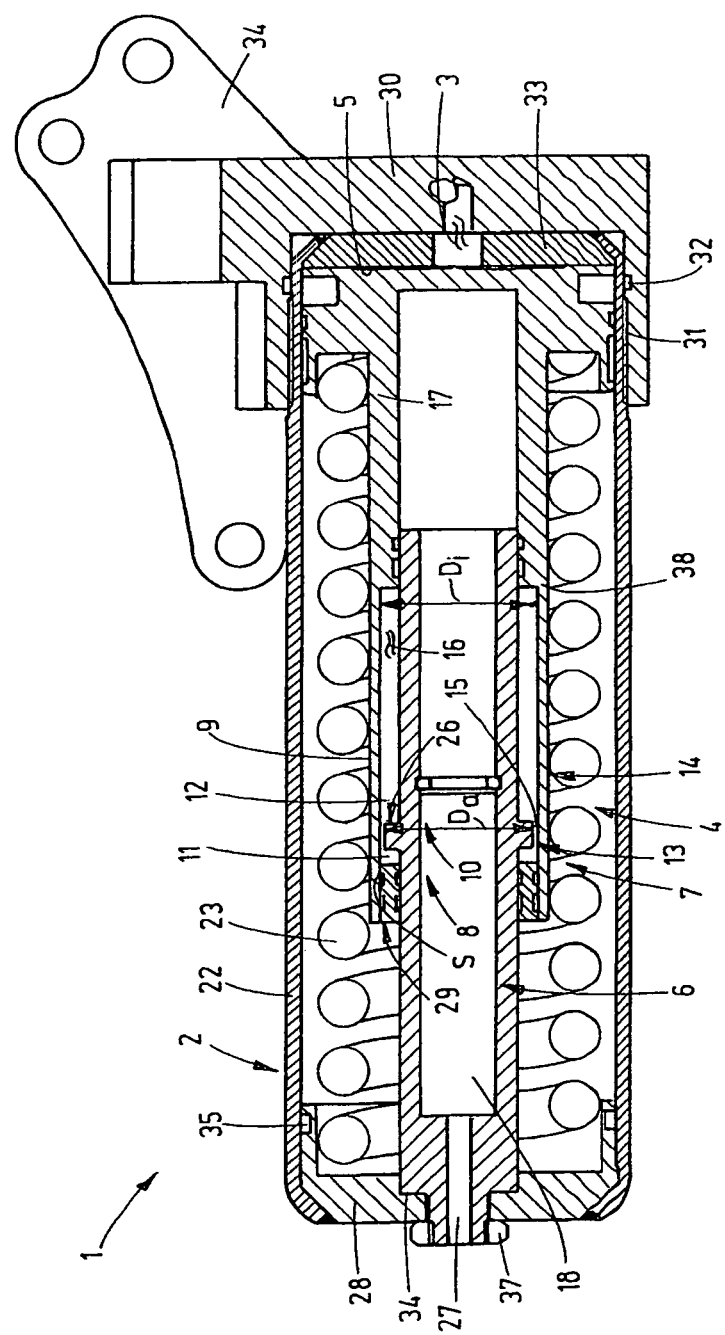
FIG. 2 is a side elevational view in section of the device from FIG. 1 in the emptied state.

FIG. 2 shows the device 1 with the coil 18 in an energized state. In this case, the electrorheological fluid 16 flows from the first working chamber 11 to the second working chamber 12 and, in so doing, had flowed over the electrorheological valve 14. As a result, the piston 5, charged from the first energy accumulator 4, is moved into a position that corresponds to a minimum of the amount of fluid 3 in the accumulator housing 2. The amount of fluid 3 is delivered to a consumer of an automatic transmission.

In this context, the amount of fluid 3 is sealed off toward the outside by a cover 30 that is configured in its fundamental shape as a cup. The cover is screwed together with the accumulator housing 2, designed as a steel cylinder, by a fine thread 31 provided on the face side of the accumulator housing 2 and is correspondingly sealed by an interposed sealing element 32. An additional element of the accumulator housing 2 is a disk-shaped cover 33 that is flanged with an end sided wall section of the accumulator housing 2. The cover 30 lies on the circumferentially flanged cover 33 that has a slightly larger passage opening for the amount of fluid 3 than the cover 30. A flange plate 34 for attaching the device 1 to an automatic transmission extends over an axial section of the accumulator housing 2, leading away from the cover 30.

The cover 28, lying opposite the cover 30, on the accumulator housing 2 is flanged with an end sided wall section of the accumulator housing 2 in the same way as the disk-shaped cover 30, with a sealing element 35 being inserted in-between. The cover 28 has a receptacle 36 in the form of a stepped borehole having a diameter that increases in the direction of the housing interior with the working piston 10 centered therein. The working piston 10 projects from the interior to the exterior through the receptacle 36 and is screwed to the cover 28 with a threaded portion and a nut 37 secured thereon. The working piston 10 forms with its end, facing the piston 5, an axial abutment for the piston 5 (see FIG. 1).

The wall thickness of the shaft 17 of the piston 5 abruptly increases, starting from the piston 5, at about half its length and, after about half its length, is less than half the wall thickness of its section, outgoing from the piston 5. This design feature permits construction of the piston 5, the shaft 17, and the cylinder housing 9 of the piston and cylinder arrangement 8 in one piece and to assemble with the other components of the device 1. As a result, especially the electrorheological valve 14 can be manufactured with fine tolerances. The piston 5 is sealed in a manner known from the prior art with sealing or piston rings inserted into circumferential grooves.

In as much as the same reference numerals are used for the exemplary embodiments described below as for the above described embodiments from FIGS. 1 and 2, the previous elucidation also applies to the components of the additional embodiments to be explained below.

Figure 3:
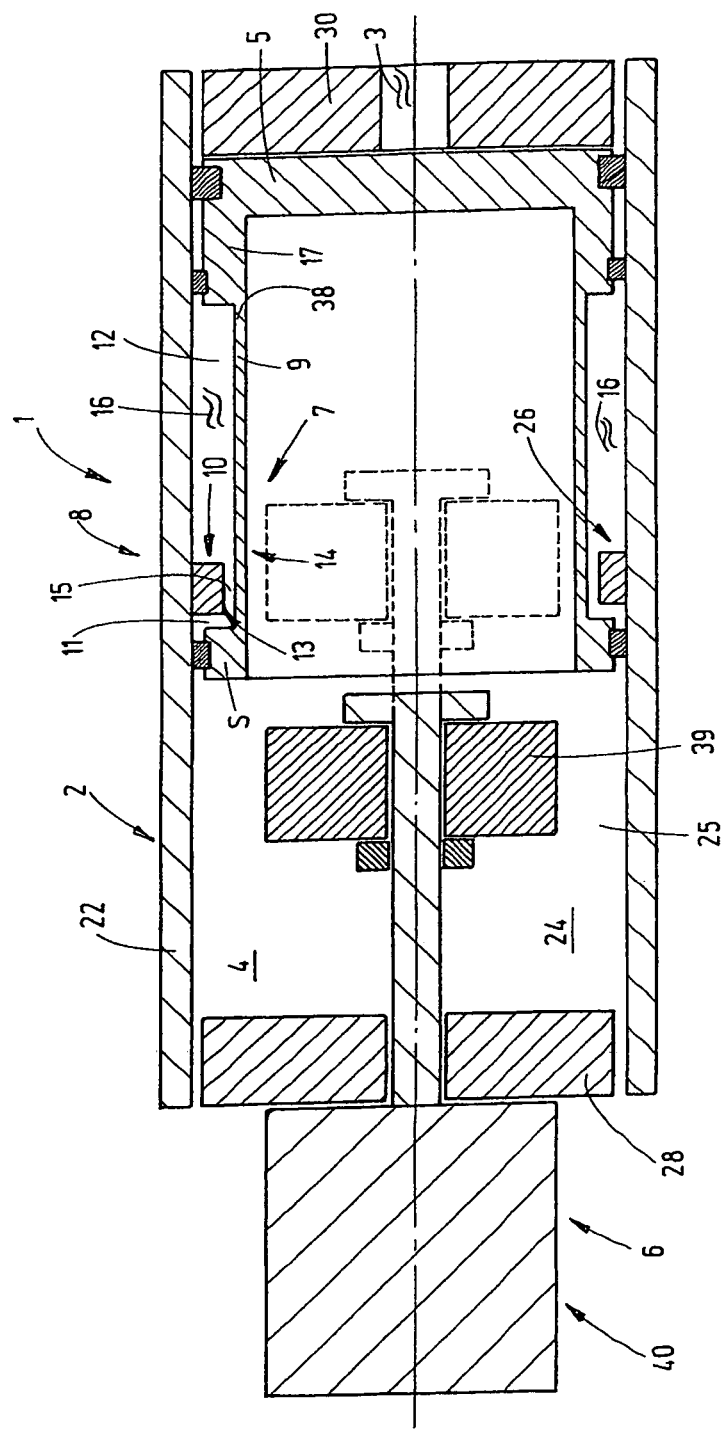
FIG. 3 is a highly simplified, side elevational view in section of a device according to a second exemplary embodiment of the invention having an electrorheologically operating locking device with a permanent magnet.

FIG. 3 is a schematic drawing of an additional embodiment of the device 1 for the pulsed release of an amount of fluid 3, with the accumulator housing 2 being depicted as a cylinder 22. The locking device 7 includes an annular expansion 26 of the wall of the cylinder 22, where the expansion forms the working piston 10 that is mounted rigidly in the housing. The expansion 26 exhibits, seen in the cross section, a rectangular shape, and is arranged at roughly half the length of the accumulator housing 2.

The piston 5 is shown in its position occupying a minimum of the volume of the fluid amount 3 in the accumulator housing 2. The piston 5 is made in one piece with the shaft 17 that represents in some areas the cylinder housing 9 of the locking device 7. Connected to the piston 5, the shaft 17 is designed such that its diameter is reduced relative to the diameter of the piston 5. The shaft 17 has an annular expansion 38 on its free end facing away from the piston 5. This annular expansion has approximately the same diameter as the diameter of the piston 5. Largely separated from the expansion 26 of the cylinder 22, the first and second working chambers 11, 12 extend axially between this expansion 38 and the piston 5.

The expansion 26 forms an annular gap 15 with respect to the shaft 17 of the piston 5. This annular gap in turn forms the electrorheological valve 14 for the electrorheological fluid 16 in the two working chambers 11, 12. This piston 5 and the expansion 38 on the shaft 17 are sealed off relative to the inner wall of the cylinder 22 with sealing elements that are inserted into grooves.

Attached to a plunger-like carrier 19, which can be moved axially in the shaft 17, are permanent magnets 39 arranged so as to be axially moveable in the area of the electrorheological valve 14. For this purpose, the carrier 19 is operatively connected to an armature of a magnet system 40. Subject to the effect of the magnetic field of the permanent magnets 39, the valve 14 is blocking, and the piston 5 remains in its current occupied position. The piston 5 shown in FIG. 3 is pushed into the illustrated position by a working gas 25 in a shaft-side working space 24 and can be prestressed into the position, represented by the continuous line, when the permanent magnet 39 is moved, in that the hydraulic fluid is pressed through the opening 27. Then the permanent magnets 39 can be moved again into the area of the valve 14. The piston 5 can hold its occupied, prestressed position. At the same time, the electrorheological fluid 16 can no longer flow from one working chamber to the other working chamber.

Figure 4:
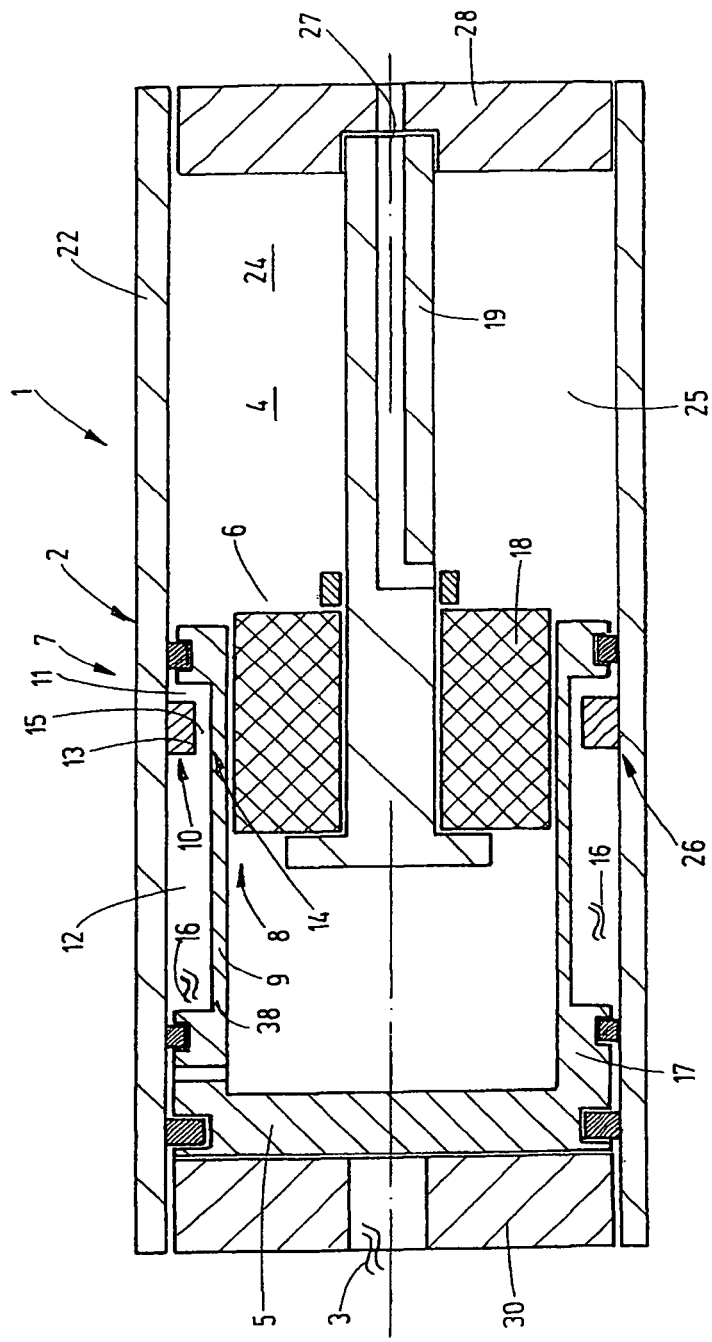
FIG. 4 is a highly simplified, side elevational view in section of a device according to a third exemplary embodiment of the invention with an electromagnetic coil disposed in a piston shaft.

FIG. 4 is a highly simplified longitudinal sectional view of an additional embodiment of a device 1 for the pulsed release of an amount of fluid 3 that is stored in an accumulator housing 2, with the accumulator housing 2, the piston 5 with the shaft 17, as well as the working piston 10 and its assigned first and second working chambers 11, 12 being constructed in the same way as shown in FIG. 3. In contrast to the exemplary embodiment shown in FIG. 3, the carrier 19 is designed so as to be rigidly mounted in the housing and serves to securely position an electromagnetic coil 18 and to make a magnetic field temporarily available at the valve 14. Furthermore, the carrier 19 has the possibility of a cable feed-through for the electromagnetic coil 18 and of introducing a working gas 25 into the space, which lies rearward of the fluid amount 3 that can be stored, and which is defined by the piston 5.

Figure 5:
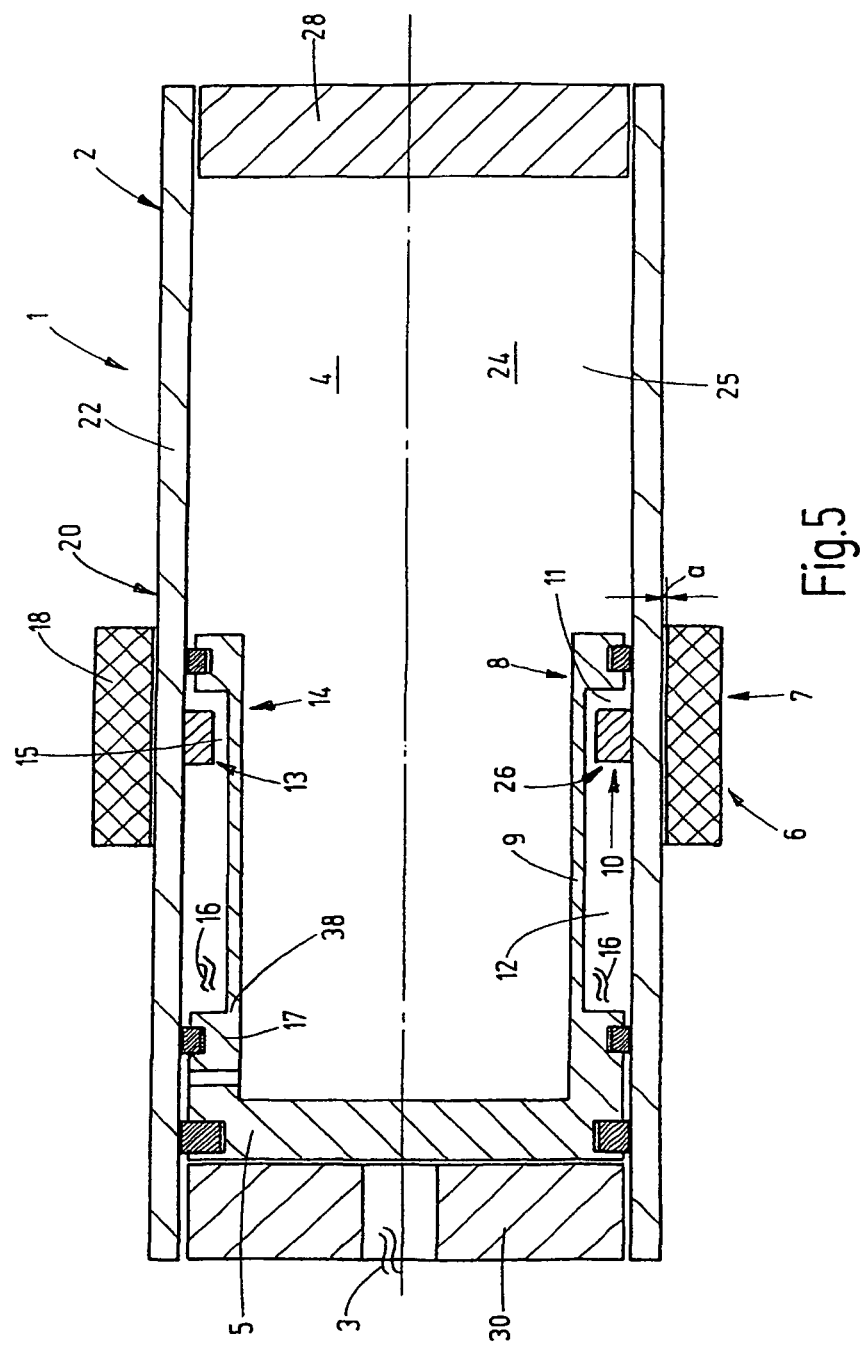
FIG. 5 is a highly simplified, side elevational view in section of a device according to a fourth exemplary embodiment of the invention with a magnetorheological locking device and an electromagnetic coil disposed on the exterior of the housing of the device.

The device 1, which is depicted in a highly simplified longitudinal view in FIG. 5, is distinguished by the electromagnetic coil 18 mounted on the exterior 20 of the cylinder 22 forming in essence the accumulator housing 2. The result is ease of assembly and maintenance possibility.

Figure 6:
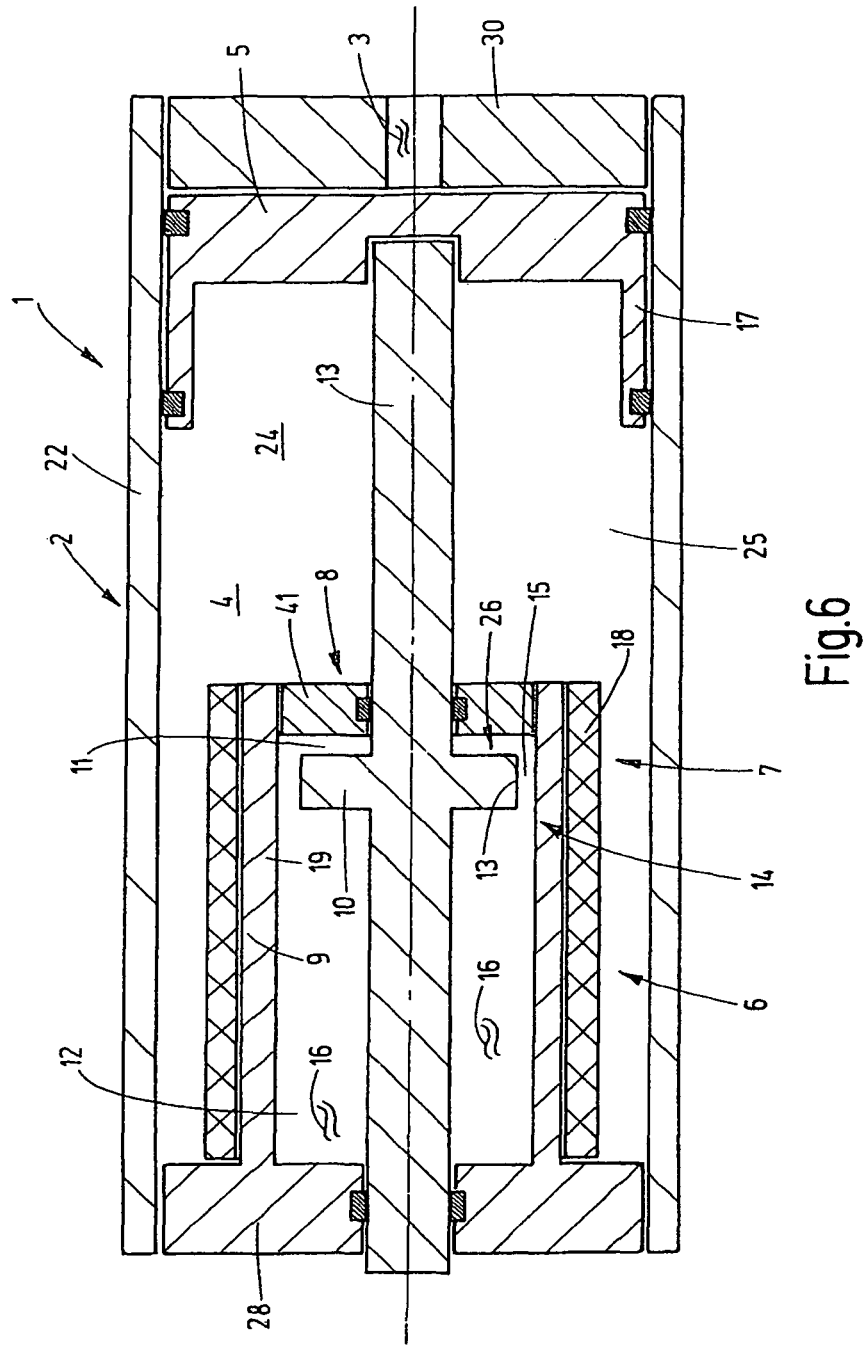
FIG. 6 is a highly simplified, side elevational view in section of a device according to a fifth exemplary embodiment of the invention.

FIG. 6 is an additional highly simplified longitudinal sectional view of a device 1 with the working piston 10 of the locking device 7 securely connected to the piston 5. The working piston 10 is designed as a cylindrical plunger with an expansion 26 on its circumference. This expansion projects radially forming the gap 15 as far as up to the inner circumference of the cylinder housing 9 of the piston and cylinder arrangement 8. The cylinder housing 9 is secured on the cover 28, which faces away from the piston 5 in the illustrated position, and is defined by a cylinder cover 41 on its free end projecting into the accumulator housing 2. The working piston 10 projects in a sealing manner through the cylinder cover 41. An electromagnetic coil 18 is arranged with a radial gap around the entire circumference of the cylinder housing 9. The magnetic field of this coil opens or closes the electrorheological valve 14.

The piston 5 is prestressed with a working gas 25 on its piston rearside. The device 1, disclosed in FIG. 6, has few moveable parts and, hence, lends itself well to a very compact design.

Figure 7:
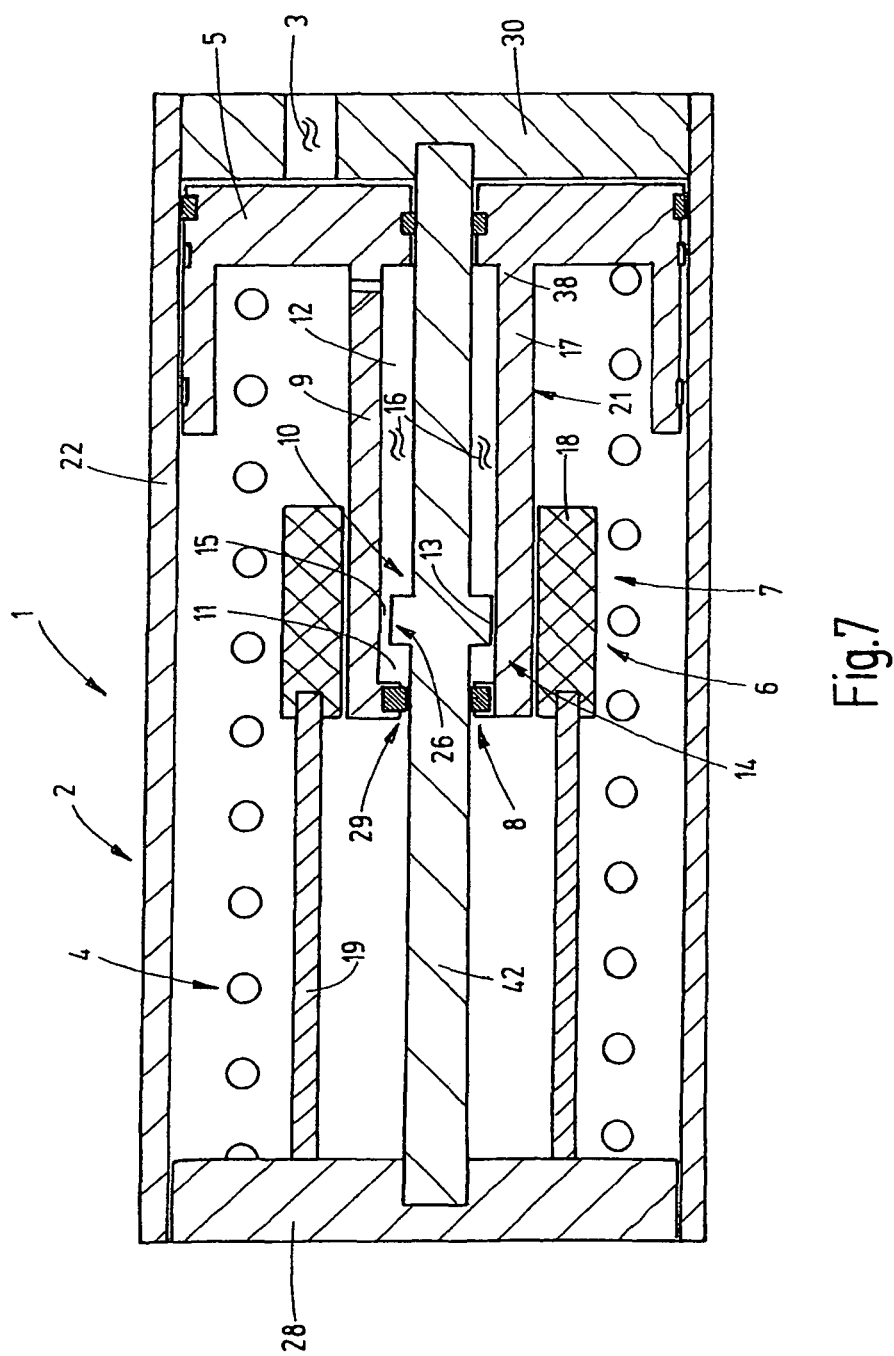
FIG. 7 is a highly simplified, side elevational view in section of a device according to a sixth exemplary embodiment of the invention.

FIG. 7 is a highly simplified longitudinal sectional view of another design variant of the device 1. The working piston 10 is provided as an expansion 26 of a cylindrical traverse 42, which projects through the accumulator housing 2 and is, thus, stable in position. The traverse 42 also projects through the piston 5 and is secured axially in the middle of the cover 28, 30 of the accumulator housing. The shaft 17 of the piston 5 forms the cylinder housing 9 for the piston and cylinder arrangement 8 and has roughly half the outside diameter as that of the piston 5. The cylinder housing 9 has a sealing device 29 on it free end facing away from the piston 5. The cylinder housing 9 slides along on the traverse 42 with the sealing device 29, designed as a stuffing box or labyrinthine seal. In the interior of the cylinder housing 9, the expansion 26 divides the two working chambers 11, 12 for the electrorheological fluid 16. An electromagnetic coil 18 is held on the carrier 19 that is rigidly mounted in the housing and that projects into the interior of the accumulator housing 2 in parallel to the wall of the cylinder 22 of the accumulator housing 2. The coil 18 is held with radial spacing a on the exterior 21 of the shaft in the axial region of the electrorheological valve 14.

Figure 8:
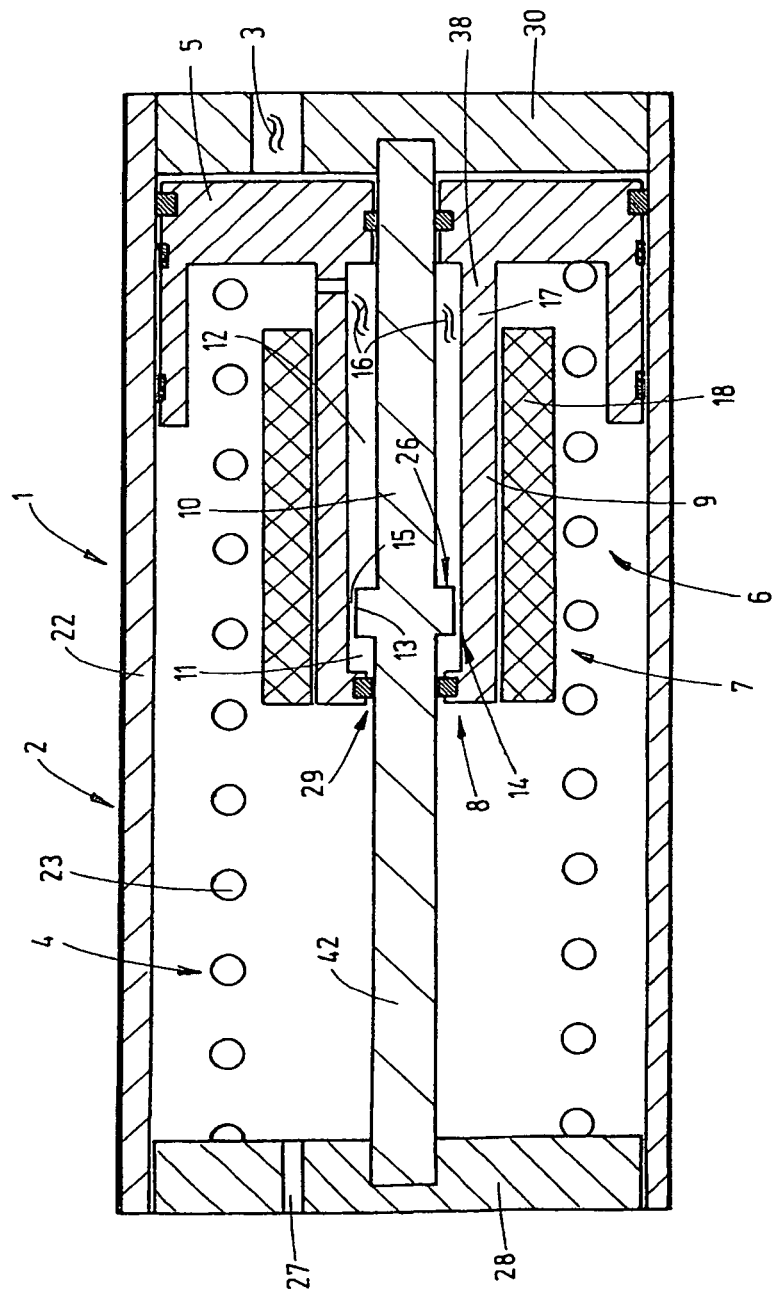
FIG. 8 is a highly simplified, side elevational view in section of a device according to a seventh exemplary embodiment of the invention.

In the position of the piston 5 shown in FIG. 7, the coil 18 is in a non-energized state; and the piston 5 is moved, subject to the action of the first energy accumulator 4, formed as the helical compression spring 23, into its position corresponding to a minimum of the stored amount of fluid 3. Insofar as the coil 18 is designed such that it extends over the entire length of the shaft 17, it can also be secured on the exterior 20 of the shaft 17 and moved together with the piston 5 (cf. FIG. 8). In this case, no need exists to provide carriers 19 for the coil, a situation shown by the exemplary embodiment in FIG. 7. The coil 18 must be supplied with power with a flexible power cable in the accumulator housing.

While various embodiments have been chosen to illustrate the invention, it will be understood by those skilled in the art that various changes and modifications can be made therein without departing from the scope of the invention as defined in the appended claims.

What is claimed is:

1. A device for pulsed release of an amount of stored fluid, comprising:
an accumulator housing;
a main piston supported on a first energy accumulator and displaceable inside said accumulator housing, said accumulator housing and said main piston limiting the amount of fluid that can be accumulated in said accumulator housing; and
a locking device holding said piston in prestressed position of said main piston in a locked position of said locking device and releasing said piston for movement in said accumulator housing under force of said first energy accumulator in a released position of said locking device, said locking device including a piston and cylinder arrangement with a cylinder housing subdivided into a first working chamber and a second working chamber by a working piston, one of a circumference or an interior of said working piston having an electrorheological or magnetorheological valve formed as a gap or opening between said working chambers, the gap or opening being charged with a variable magnetic or electric field forming an actuating device, flow resistance of said electrorheological or magnetorheological fluid located in said working chambers being variable up to a blockage of said gap or opening;
whereby, when said main piston is released by said locking device upon actuation of said actuating device, said main piston pushes the amount of fluid out of said accumulator housing in a pulsed manner.

2. A device according to claim 1 wherein
a start-stop function in an automatic transmission is implemented by the device.

3. A device according to claim 1 wherein
said working piston is firmly connected to said accumulator housing; and
said main piston has a shaft serving as said cylinder housing, said shaft being centrally arranged and projecting axially away from a head of said main piston.

4. A device according to claim 3 wherein
said first and second working chambers are arranged between said shaft and said accumulator housing.

5. A device according to claim 3 wherein
said first and second working chambers are arranged between said shaft and said working piston.

6. A device according to claim 1 wherein
an electromagnetic coil projects into said shaft at said main piston.

7. A device according to claim 3 wherein
an electromagnetic coil is disposed on an exterior of said shaft with a radial spring.

8. A device according to claim 3 wherein
said shaft comprises a hollow cylinder; and
said accumulator housing comprises a cylinder in certain areas thereof, said shaft being longitudinally displaceable between first and second end positions.

9. A device according to claim 3 wherein
said shaft is a unitary, one piece with said main piston.

10. A device according to claim 3 wherein
said shaft axially abuts said accumulator housing in a position defining a maximum fluid amount in said accumulator housing.

11. A device according to claim 3 wherein
an electromagnetic coil for generating an electromagnetic field is disposed in said working piston.

12. A device according to claim 1 wherein
an electromagnetic coil is disposed on an exterior of said accumulator housing.

13. A device according to claim 1 wherein
said first energy accumulator comprises a compression spring.

14. A device according to claim 1 wherein said first energy accumulator comprises a working space with a working gas.

\* \* \* \* \*